3,117,225
CHROMATOGRAPHY FOR MEASURING TRACES OF IMPURITIES IN A GAS
Vincent Willis, Norton-on-Tees, England, assignor to Imperial Chemical Industries Limited, London, England, a corporation of Great Britain
Filed Mar. 23, 1960, Ser. No. 17,149
Claims priority, application Great Britain Apr. 1, 1959
11 Claims. (Cl. 250—43.5)

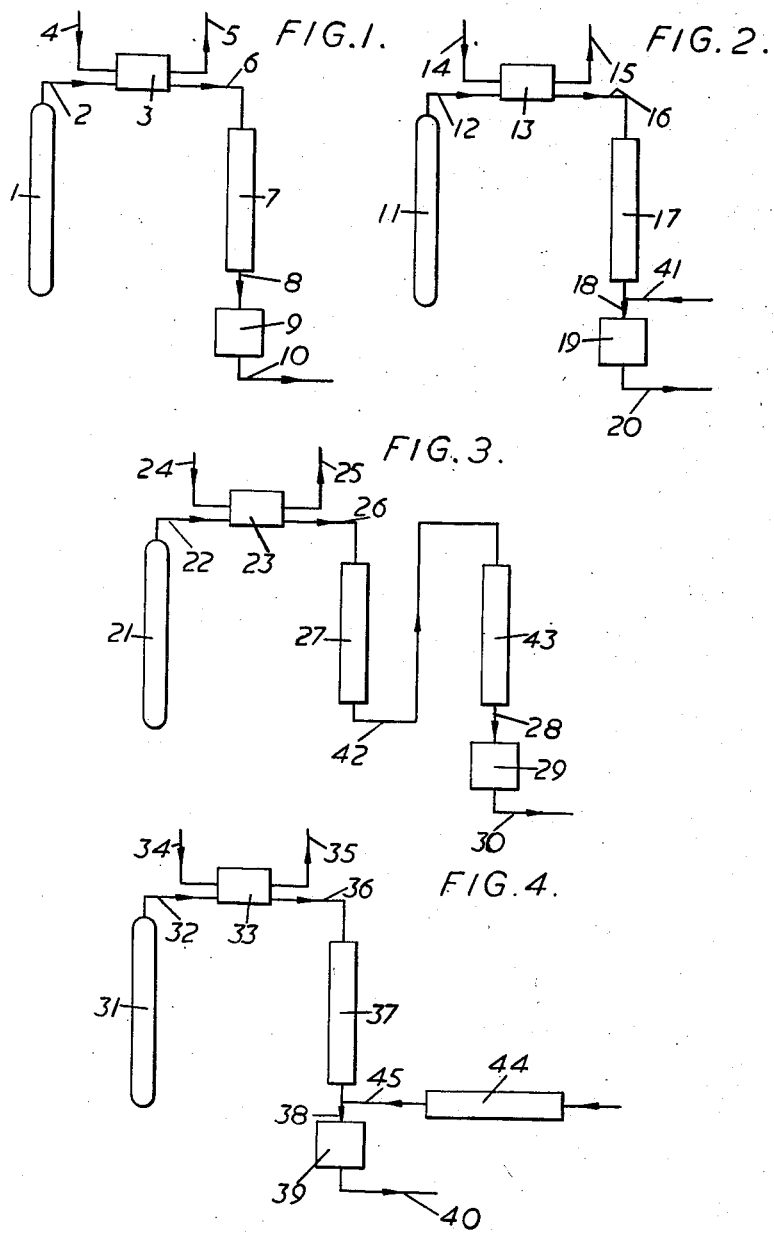

This invention relates to gas detection by means of gas detectors of the radioactive ionisation type.

A sensitive device, siutable for measuring concentrations of traces of impurities in a gas, has been described by J. E. Lovelock in Journal of Chromatography, vol. 1 (1958), No. 1, pages 35–46. The device, which has largely been developed for use in gas chromatography, employs one of the noble gases as carrier gas; and it has an ionisation chamber in which a stream of gas (usually at about atmospheric pressure) consisting of a mixture of carrier gas and impurities to be detected is ionised by means of radiation from a source comprising a suitable radioactive isotope. The presence of traces of impurities in the stream of carrier gas gives rise to fluctuations in the steady level of ionisation produced when pure carrier gas is passed through the device, the extent of these fluctuations being dependent on the nature and concentration of the impurities. Hence the impurities may be detected by passing the ionisation current produced by the ionisation chamber through a high resistance input to a D.C. amplifier, the output of which is preferably connected to a null balance potentiometric recorder. By calibrating the device it becomes possible to measure the concentration of impurities in the stream of carrier gas.

By the term "noble gases" is meant the inert gases of group 0 of the periodic table of elements. The cost of some of these gases in a satisfactorily pure state renders them unsuitable as carrier gases; and in practice argon is preferred.

A process of detecting, or measuring the concentration of, traces of impurities in a carrier gas by the method indicated above, using a gas detector of the radioactive ionisation type, is particularly suitable for use in gas chromatography.

It has been found that a radioactive ionisation device as described above has a much greater sensitivity as a gas detector than a thermal conductivity cell of the type which is in common use, except when the device is used for detection of a gas having an ionisation potential which is greater than the excitation potential of metastable atoms of the noble gas used as a carrier gas in the detector. However, we have found that the sensitivity of the device in the latter circumstances may be increased by introducing into the stream of carrier gas which is passed through the ionisation chamber a small quantity of a substance as hereinafter defined.

According to the present invention therefore there is provided a process of gas detection comprising mixing a sample to be detected with a noble gas as a carrier gas, passing a stream of the resulting mixture through an ionisation chamber, ionising the gas mixture by means of a radioactive source, and detecting fluctuations in the degree of ionisation produced, characterised in that the said stream contains a known, relatively small, substantially constant amount of a substance in the gaseous phase, the said substance having an ionisation potential which is at most substantially equal to the excitation potential of metastable atoms of the noble gas.

The process of the present invention is particularly convenient for detection of substances having ionisation potentials which are greater than the excitation potential of metastable atoms of the noble gas used as a carrier gas in the said process, the ionisation detector being rendered more sensitive by the presence in the gas stream of a substance as hereinbefore defined.

As so-called permanent gases usually have ionisation potentials which are greater than the excitation potential of metastable atoms of argon, when argon is used as the carrier gas the process of the present invention is particularly applicable to detection of permanent gases. By the term "permanent gas" is meant a gas which cannot be liquefied by application of pressure at atmospheric temperature. As examples of permanent gases there may be mentioned hydrogen, nitrogen, oxygen and methane.

Although the ionisation potential of the said substance mixed with the noble carrier gas may be equal to, or even slightly greater than, the excitation potential of metastable atoms of the noble gas, it is preferred that the ionisation potential of the substance be less than the excitation potential of metastable atoms of the noble gas. This condition required by the invention is satisfied by most organic compounds and by a number of inorganic compounds also. However, in the choice of a suitable substance many practical considerations are important, such as for example toxicity, ease of handling, cost and degree of purity of the various materials available. Substances having characteristics which render them suitable for use in the invention include, for example, nitric oxide, ethylene, acetylene, ethane, propane, propylene, butane, n-butene and iso-butene (which are gaseous under normal conditions), dimethyl sulpholane, dinonyl phthalate, polyisobutylene, diethyl succinate, dimethyl formamide, diglycerol and squalane (which are liquid under normal conditions), and 7,8-benzoquinoline and benzyl diphenyl (which are solid under normal conditions).

The substance as hereinbefore defined may conveniently be present in the gas stream passed into the ionisation chamber to the extent of between about 10 and 1,000 parts per million. In any particular case the optimum concentration of the said substance depends on the circumstances, and may be ascertained by experiments.

The noble gas used as a carrier may conveniently be argon.

The process of the present invention may be effected by mixing an appropriate known amount of the said substance with the noble gas, and using the resulting mixture as a supply of carrier gas. This method of introducing the substance may conveniently be carried out by using, for example, ethylene or acetylene.

However, this is not always convenient. For instance in gas chromatography a carrier gas is passed through a chromatographic column before being passed through a gas detector; and the presence in the carrier gas of a substance as hereinbefore defined, such as for example ethylene or acetylene, may have a deleterious effect on the chromatographic column. Hence, it is some times preferred, for instance in applications of the invention to gas chromatography, to add the said substance to the carrier gas after the latter has passed through the chromatographic column and before it enters the gas detector. This introduction of the said substance will normally be effected at a substantially constant rate.

According to a particular embodiment of the invention, therefore, the substance added to the carrier gas is introduced at a metered rate of flow through a side branch in the gas detector inlet tube through which the carrier gas is passed. This method of introduction may conveniently be carried out by using, for example, ethylene or acetylene.

The said substance may conveniently be introduced into the stream of carrier gas in dilution with gas of the same nature as the carrier gas.

If the said substance be introduced in an undiluted form, the flow rate must be very low and a highly accurate metering technique is essential. For example the substance may be bled through a long capillary tube into the carrier gas stream, and the rate of entry determined by measuring the pressure drop along the capillary tube.

A very convenient way of introducing the said substance into the carrier gas stream comprises passing a carrier gas stream over the substance in liquid or solid form, thereby producing a gas stream containing a substantially constant amount of the substance, the amount depending on the vapour pressure or sublimation pressure respectively of the liquid or solid.

The said liquid or solid may be contained in the ionisation detector itself; but more conveniently it is contained in a column external to the detector. In order to increase the area of contact of the gas stream with the liquid or solid, the column is preferably packed with small pieces of an inert material, such as for example fire brick. The carrier gas passed through the said column may be the main carrier gas stream; or alternatively a subsidiary stream of carrier gas may be passed through the column and then through a side branch in the gas detector inlet tube through which the main carrier gas stream is passed.

The amount of the said substance in the gas stream emerging from the said column may very conveniently be controlled by controlling the temperature of the column, which determines the vapour pressure or sublimation pressure respectively of the liquid or solid contained therein.

The said liquid or solid may be any substance which evaporates or sublimes at a convenient rate and also satisfies the requirements hereinbefore mentioned. Thus, for example, the following may conveniently be used: 7,8-benzoquinoline, benzyl diphenyl, dimethyl sulpholane, dinonyl phthalate, polyisobutylene, diethyl succinate, dimethyl formamide, diglycerol and squalane. In practice we have found that 7,8-benzoquinoline is particularly convenient, because at a convenient temperature it has a suitable vapour pressure, and also is satisfactory as regards other requirements, such as for example toxicity and purity.

For the better understanding of the invention specific forms thereof are described with reference to the accompanying drawing, in which FIGURES 1 to 4 respectively are diagrammatic drawings illustrating different ways of carrying out the invention when using an ionisation detector in gas chromatography.

Referring to FIGURES 1 to 4, a gaseous sample to be detected is passed by means of tubes 4 and 5, 14 and 15, 24 and 25 and 34 and 35 respectively through the sample injection system 3, 13, 23 or 33, where it is mixed with carrier gas (argon) which enters through tubes 2, 12, 22 or 32 from the cylinder 1, 11, 21 or 31. The mixed gases pass through tubes 6, 16, 26 or 36 into the chromatographic column 7, 17, 27 or 37 where separation of the sample into its components takes place. In each case the gas stream eventually passes through tube 8, 18, 28 or 38 into the gas detector 9, 19, 29 or 39 of the radioactive ionisation type, and finally leaves through tube 10, 20, 30 or 40. The gas detector is operated in the manner discussed above.

Referring to FIGURE 1, a suitable gaseous substance, such as for example acetylene, to the extent of say 50 parts per million, is mixed with the argon in the cylinder 1, the mixture being used as carrier gas.

Referring to FIGURE 2, a suitable gas, say acetylene, is introduced through a side piece 41 into the stream of gas in tube 18. The acetylene may be introduced in dilution with argon; or alternatively it may be introduced alone, in which case the side piece 41 may conveniently comprise a capillary tube, the rate of introduction of acetylene being determined by the pressure drop along it.

Referring to FIGURE 3, the gas stream emerging from the chromatographic column 27 is passed via tube 42 into a column 43 containing a suitable substance (say 7,8-benzoquinoline) and packed with small pieces of an inert material, such as for example fire brick. This column is maintained at an appropriate temperature by means of a thermostat. The gas stream emerges from the column, containing a constant amount of the 7,8-benzoquinoline or its equivalent, and then passes through the gas detector 29. The column 43 may be of any convenient length. It should be more than a certain minimum, in order to ensure that the gas stream emerging is of the desired concentration with respect to the 7,8-benzoquinoline or its equivalent. Above this minimum the length merely determines the life of the column before it need be recharged.

As an alternative arrangement to that shown in FIGURE 3, instead of being contained in column 43 the 7,8-benzoquinoline or its equivalent may be contained in the detector 29, which is appropriately modified.

Referring to FIGURE 4, as stream of argon at a metered rate of flow is passed through a column 44 containing 7,8-benzoquinoline or its equivalent. The gas stream emerging, containing a constant amount of the 7,8-benzoquinoline or its equivalent, is passed through a side branch 45 into the inlet tube 38 carrying the main stream of carrier gas into the detector 39.

When using the process of the present invention, employing acetylene, we have found that a concentration of the acetylene in the detector of about 50 parts per million with respect to the carrier gas (argon) gives optimum results. By means of the present invention we have been able to detect gases such as for example hydrogen, nitrogen, oxygen and methane to a concentration in argon as low as one part per million. Thus the invention is capable of increasing by a factor of about 100 the sensitivity of a radioactive ionisation type detector to gases having ionisation potentials which are greater than the excitation potential of metastable atoms of argon or other noble gas used as a carrier in the detector. When using 3 parts per million of 7,8-benzoquinoline we have been able to detect oxygen and nitrogen to concentrations in argon of 3 and 10 parts per million respectively.

I claim:

1. In a process of gas detection comprising mixing a sample to be detected with a noble gas as a carrier gas, passing a stream of the resulting mixture through an ionisation chamber, ionising the gas mixture by means of a radioactive source, and detecting fluctuations in the degree of ionisation produced, the improvement which comprises continuously having in the said stream in the ionisation chamber a known, relatively small, substantially constant amount of a substance in the gaseous phase, which substance has an ionisation potential which is at most substantially equal to the excitation potential of metastable atoms of the noble gas.

2. A process according to claim 1 in which the ionisation potential of the said substance is less than the excitation potential of metastable atoms of the noble gas.

3. A process according to claim 1 in which the said substance is present in the gas stream passed into the ionisation chamber to the extent of between 10 and 1,000 parts per million.

4. A process according to claim 1 in which the noble gas in is argon.

5. A process according to claim 1 in which an appropriate known amount of the said substance is mixed with the noble gas, and the resulting mixture is used as a supply of carrier gas.

6. A process according to claim 1 in which the said substance added to the carrier gas is introduced at a metered rate of flow through a side branch in the gas detector inlet tube through which the carrier gas is passed.

7. A process according to claim 6 in which the said substance is introduced into the stream of carrier gas in dilution with gas of the same nature as the carrier gas.

8. A process according to claim 6 in which the said substance is bled through a long capillary tube into the carrier gas stream, and the rate of entry is determined by measuring the pressure drop along the capillary tube.

9. A process according to claim 1 in which the said substance added to the carrier gas is introduced by passing the carrier gas stream over the substance in non-gaseous form, thereby producing a gas stream containing a substantially constant amount of the substance, the amount depending on the vapour pressure of the substance in its non-gaseous form.

10. A process according to claim 9 in which the amount of the said substance in the gas stream emerging from the said column is controlled by controlling the temperature of the said column.

11. A process according to claim 9 in which the said substance is 7,8-benzoquinoline.

References Cited in the file of this patent

UNITED STATES PATENTS 3,009,063     Roehig _____ Nov. 14, 1961

OTHER REFERENCES

Ionization by Alpha Particles in Mixtures of Gases by Jesse et al., Physical Review, vol. 100, No. 6, Dec. 15, 1955, pages 1755 to 1762.

Vapor Phase Chromatography by Desty, Butterworths Scientific Publications, London, 1957, pages 169 to 184.

A Radiological Detector for Gas Chromatography by Deal et al., Analytical Chemistry, vol. 28, No. 12, April 1956, pages 1958 to 1964.